United States Patent
Chu

(10) Patent No.: US 7,703,202 B2
(45) Date of Patent: Apr. 27, 2010

(54) METHOD FOR MANUFACTURING A TRANSMISSION LINE EQUALIZER

(75) Inventor: Cheng-Hui Chu, Taipei (TW)

(73) Assignee: Inventec Corporation, Taipei (TW)

( * ) Notice: Subject to any disclaimer, the term of this patent is extended or adjusted under 35 U.S.C. 154(b) by 124 days.

(21) Appl. No.: 12/010,074

(22) Filed: Jan. 18, 2008

(65) Prior Publication Data

US 2009/0183362 A1  Jul. 23, 2009

(51) Int. Cl.
  *H05K 3/10* (2006.01)
  *H05K 3/02* (2006.01)
(52) U.S. Cl. .................. 29/846; 29/593; 29/602.1; 29/610.1; 333/28 R; 702/64; 702/75; 702/106; 702/189; 324/615; 324/616; 324/638
(58) Field of Classification Search .......... 324/615, 324/616, 638; 29/593, 594, 602.1, 610.1; 702/76; 333/28 R
See application file for complete search history.

(56) References Cited

U.S. PATENT DOCUMENTS

| | | | | |
|---|---|---|---|---|
| 5,434,883 A | * | 7/1995 | Kimoto et al. .............. 375/231 |
| 6,397,156 B1 | * | 5/2002 | Bachmann et al. ............ 702/65 |
| 6,713,998 B2 | * | 3/2004 | Stanimirov et al. ..... 324/117 R |
| 6,927,645 B2 | * | 8/2005 | Errington .................. 333/28 R |
| 7,504,906 B2 | * | 3/2009 | Chu ......................... 333/28 R |
| 2004/0080323 A1 | * | 4/2004 | Bostoen et al. ............. 324/624 |

OTHER PUBLICATIONS

Aksen, Ahmet et al., A Numerical Real Frequency Broadband Matching Technique Based on Parametric Representation of Scattering Parameters, 1998, IEEE, pp. 351-353.*
Sengul, Metin et al., Broadband Equalizer Design with Commensurate Transmission Lines via Reflectance Modeling, IEICE Trans. Fundamentals, vol. E91-A, Dec. 2008.*

* cited by examiner

*Primary Examiner*—Derris H Banks
*Assistant Examiner*—Jeffrey Carley
(74) *Attorney, Agent, or Firm*—CKC & Partners Co., Ltd.

(57) ABSTRACT

A method for manufacturing an equalizer used to compensate a digital signal passed by a transmission line, in which the digital signal can be presented as a frequency-domain function. The method includes measuring a the transmission line scattering-parameter; performing an integration and a differentiation about the transmission line scattering-parameter, the frequency-domain function, the ideal gain, and an equalizer scattering-parameter to get the component impedances of the equalizer; and manufacturing the equalizer circuit with the derived component impedances.

12 Claims, 7 Drawing Sheets

METHOD FOR MANUFACTURING A TRANSMISSION LINE EQUALIZER

BACKGROUND

1. Field of Invention

The present invention relates to a manufacturing method of an equalizer. More particularly, the present invention relates to a manufacturing method of a transmission line equalizer.

2. Description of Related Art

As the working frequencies of the integrated circuits increase, transmission line signal degradation increasingly becomes the major cause of signal losses. To prevent signal distortion due to the signal losses caused by the transmission lines, a passive equalizer is used to compensate for the signal losses at high frequency.

The passive equalizer is composed of passive components such as resistors, inductors, and capacitors. The passive equalizer operates as a high-passing filter while the transmission lines operate as a low-passing filter. Because the passive equalizer can compensate the high frequency signal losses, the transmitted signal can approximate the original signal, which reduces the signal distortion.

However, the conventional method for manufacturing the passive equalizer can't predict the required component impedances effectively. In the conventional way, various component impedances are tried and simulated to derive suitable component impedances. This method wastes human resources and is not able to compensate for the signal losses accurately.

For the foregoing reasons, there is a need for a new method to manufacture the equalizer more effectively and compensate the signal losses more accurately.

SUMMARY

According to one embodiment of the present invention, a method for manufacturing an equalizer used to compensate digital signals passed by a transmission line is disclosed. The method includes measuring the transmission line scattering-parameter, performing an integration and a differentiation about the transmission line scattering-parameter, the frequency-domain function, the ideal gain, and an equalizer scattering-parameter to get the component impedances of the equalizer, and manufacturing the equalizer circuit with the derived component impedances.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
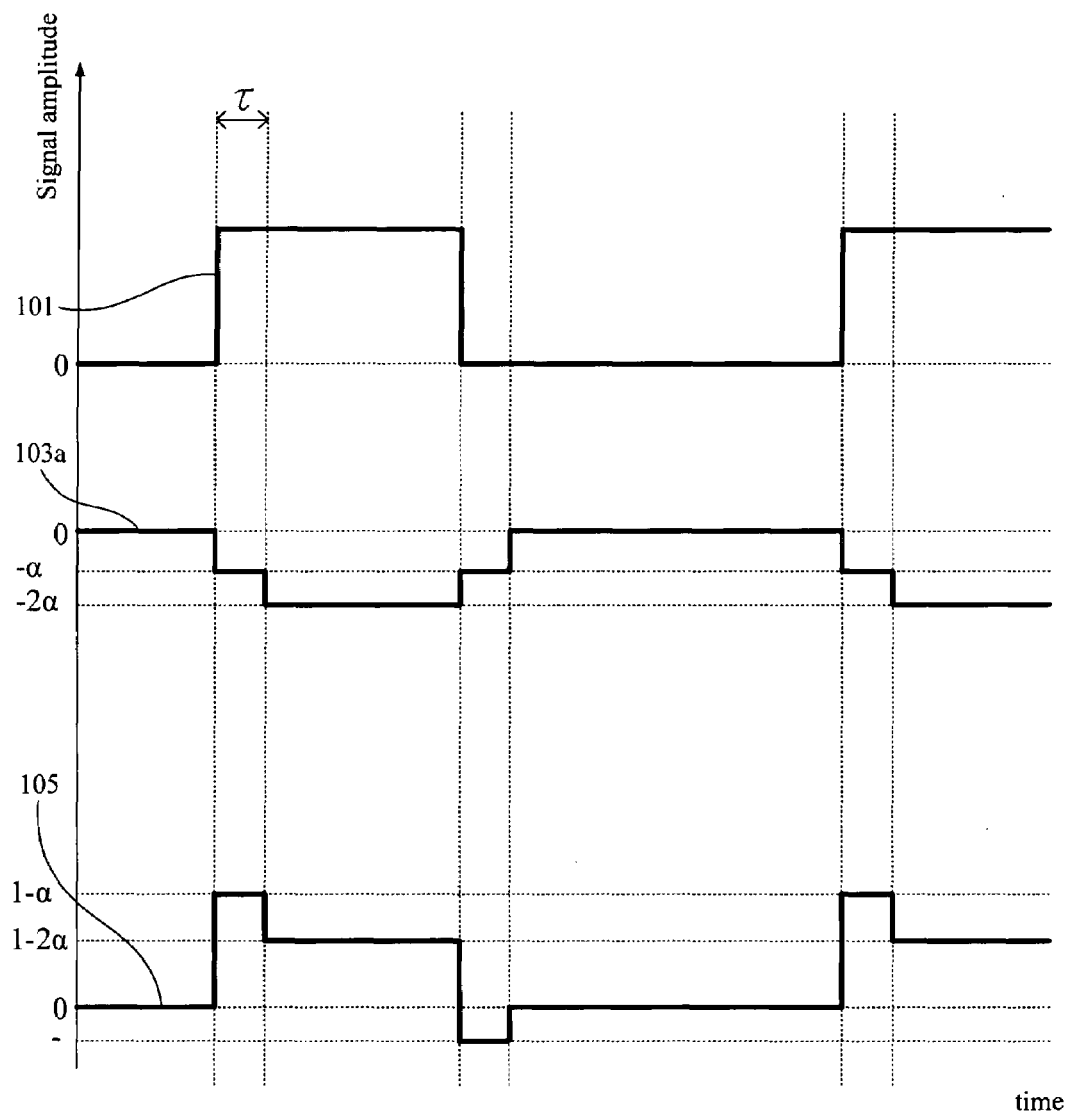
FIG. 1A shows the time-domain waveform of the digital signal according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In order to compensate for signal losses caused by transmission lines, the following embodiments show the method of manufacturing transmission line equalizers, which are electrically connected to the transmission lines. The method shown below improves the manufacturing processes of the equalizer and reduces unnecessary circuit simulation. Furthermore, the method can compensate the signal losses caused by the transmission line more accurately.

Figure 1B:
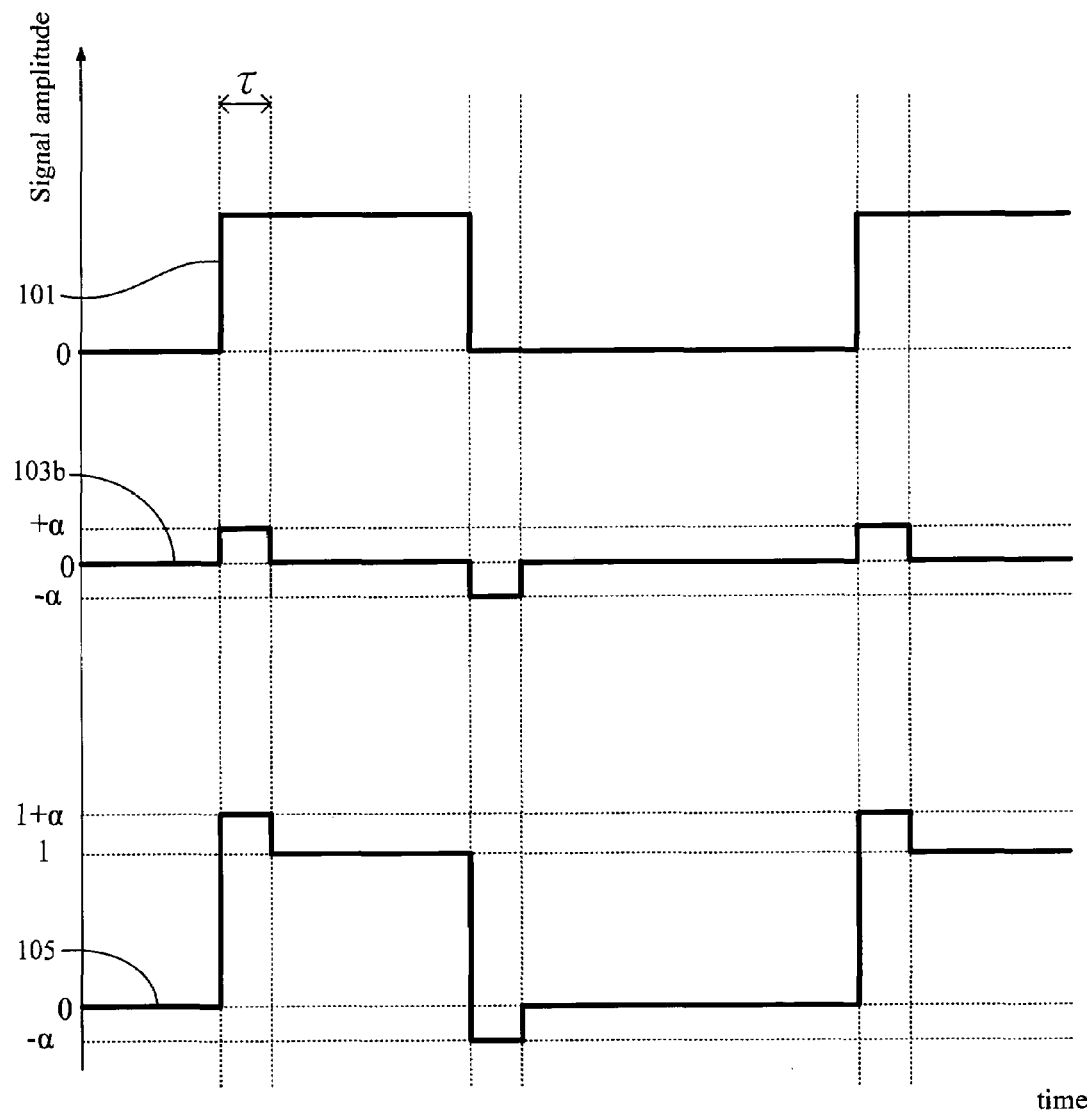
FIG. 1B shows the time-domain waveform of the digital signal according to another embodiment of the present invention.

FIG. 1A and FIG. 1B show the time-domain waveforms of the digital signal according to one embodiment of the present invention. During high-speed transmission, the transmission line usually causes some attenuation on the original digital data 101. To compensate for signal losses caused by the transmission line, the present bus systems, such as the Peripheral Component Interconnect (PCI) interface, the PCI Express (PCIe) interface, the Serial ATA (SATA) interface, and the Parallel ATA interface (PATA) generally provide the de-emphasis signal 103a, the pre-emphasis signal 103b, the merged signal 105 (merged by the de-emphasis signal 103a\pre-emphasis signal 103b and the original digital signal 101) and the original digital signal 101 for the integrated circuit.

$F(t)$ and $F(\omega)$ represent a time-domain function and a frequency-domain function of the original digital signal 101 respectively. The de-emphasis signal 103a and the pre-emphasis signal 103b are the de-emphasized original digital signal and the pre-emphasized original digital signal respectively. The time-domain function and frequency-domain function of the de-emphasis signal 103a are $F_{Emp}(t)=(1-\alpha)F(t)-\alpha F(t-\tau)$ and $F_{Emp}(\omega)=(1-\alpha)F(\omega)-\alpha F(\omega)e^{j\omega\tau}$ respectively, while the time-domain function and frequency-domain function of the pre-emphasis signal 103b are $F_{Emp}(t)=(1+\alpha)F(t)-\alpha F(t-\tau)$ and $F_{Emp}(\omega)=(1+\alpha)F(\omega)-\alpha F(\omega)e^{j\omega\tau}$ respectively, in which τ presents the delay time (time shift amount).

Figure 2:
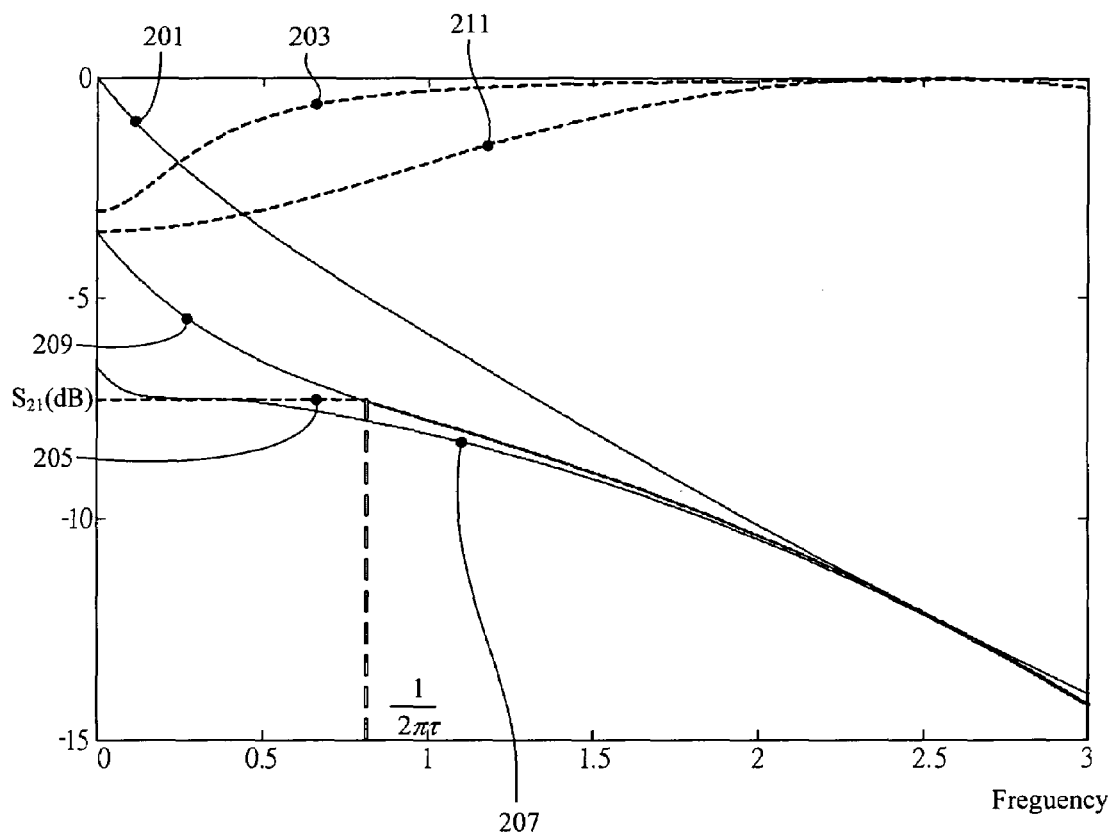
FIG. 2 shows signal frequency response according to one embodiment of the present invention.

FIG. 2 shows the signal frequency response according to one embodiment of the present invention. In FIG. 2, the transmission line scattering-parameter 201 decreases as the frequency increases, which represents the low-passing effect, while the equalizer scattering-parameter 203 and the de-emphasis\pre-emphasis signal 211 increases as the frequency increases, which presents the high-passing effect. The product function 209 is product of the transmission line scattering parameter 201 and the de-emphasis\pre-emphasis signal 211. To prevent the phase of the compensated digital signal 207 from exceeding the specified limit, which makes the compensated digital signal 207 unstable, the gain of the product function 209 at frequency ½πτ is selected for the ideal gain.

The equalizer scattering-parameter 203 varies with the component impedances of the equalizer. For example, the equalizer scattering-parameter 203 varies as the resistance of the equalizer changes. Because both of the product function 209 and the equalizer scattering-parameter 203 effect the compensated digital signal 207, the gain of the compensated digital signal 207 can be tuned by tuning the component impedance of the equalizer. In other words, tuning the component impedances of the equalizer can make the gain of the compensated output signal 207 approach the ideal gain 205 within frequency ½πτ.

Figure 3:
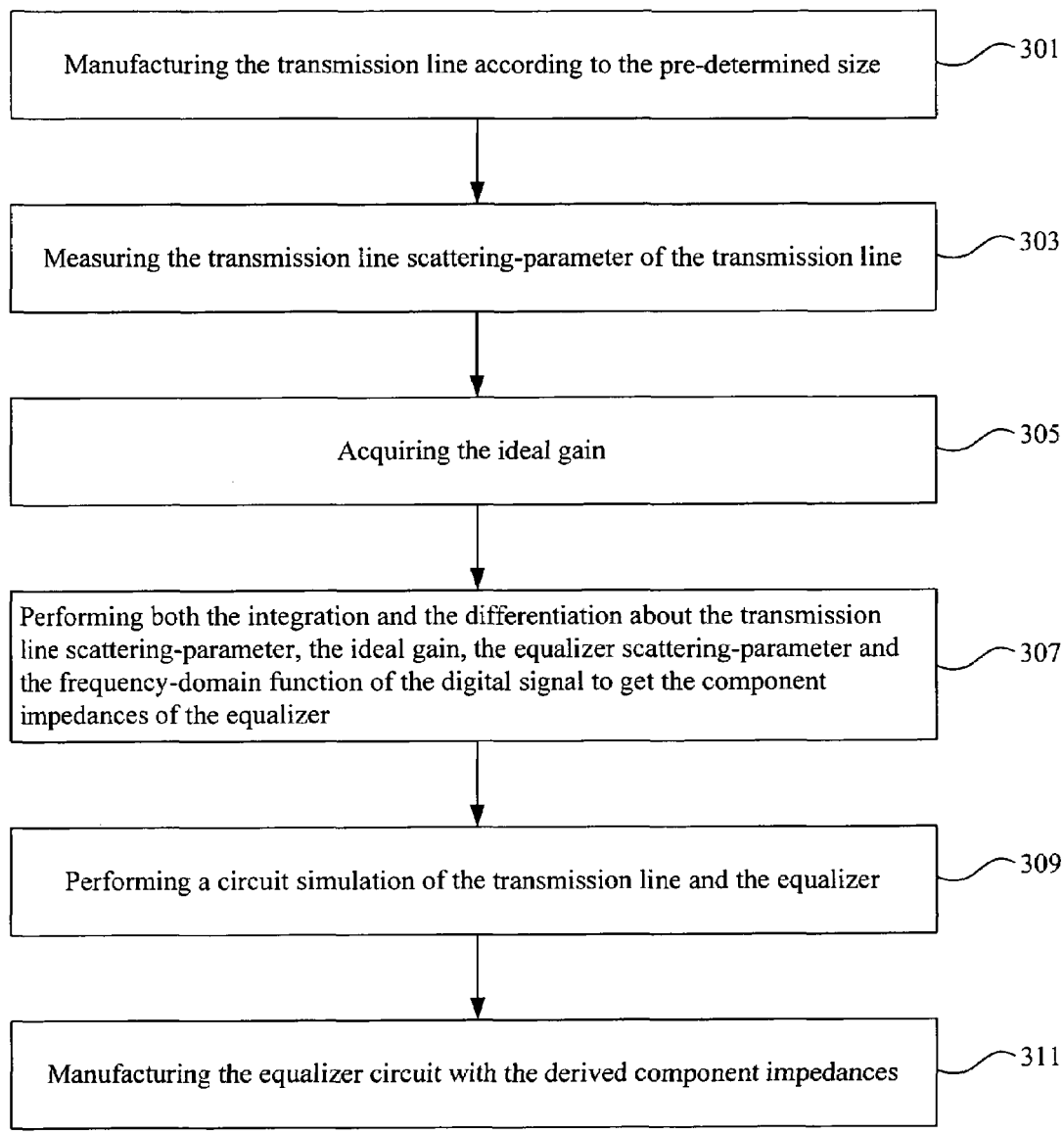
FIG. 3 shows the flow chart for manufacturing the equalizer according to one embodiment of the present invention.

FIG. 3 shows the flow chart for manufacturing the equalizer according to one embodiment of the present invention. In the beginning, the transmission line is manufactured according to the pre-determined size (step 301), in which the transmission line scattering-parameter varies with transmission lines of different sizes. Next, in step 303, the vector network analyzer measures the transmission line scattering-parameter of the transmission line. Then in step 305, the gain of the transmission line scattering-parameter is measured at a frequency ½πτ, in which the gain at the frequency ½πτ represents the ideal gain.

After acquiring the transmission line scattering-parameters and the ideal gain, software, such as Matlab, performs both the integration and the differentiation about the transmission line scattering-parameter, the ideal gain, the equalizer scattering-parameter and the frequency-domain function of the digital signal to get the component impedances of the equalizer (step 307).

The integration $$\int_0^\infty |(H_{TX-Line}(f) \times H_{emp}(f) \times H_{equalizer}(f)) - H_{ideal}(f)| \, df = \min$$

selects the component impedances, which make the gain of the compensated digital signal approach the ideal gain. In the integration, $H_{TX-Line}(f)$ represents the transmission line scattering-parameter, $H_{emp}(f)$ represents the frequency-domain function of the digital signal, $H_{equalizer}(f)$ represents the equalizer scattering-parameter, $H_{ideal}(f)$ represents the ideal gain, and the min represents the minimum positive number.

The differentiation $$\frac{d\{20\log_{10}\lfloor H_{TX-Line}(f) \times H_{emp}(f) \times H_{equalizer}(f)\rfloor\}}{df} \leq 0$$

further selects the component impedances which make the gain's slope of the 20 compensated digital signal fixed or less than zero at a frequency less than ½πτ. In the differentiation, $H_{TX-Line}(f)$ represents the transmission line scattering-parameter, $H_{emp}(f)$ represents the frequency-domain function of the pre-emphasized/de-emphasized digital signal, and $H_{equalizer}(f)$ represents the equalizer scattering-parameter Although the integration is able to derive the component impedances which make compensated digital signal approach the ideal gain, however, if only the integration is performed, the gain of the compensated digital signal might still have a maximum value or a minimum value (peak value) at the frequency less than ½πτ. In other words, with only the integration, the gain of the digital signal might not monotonically decreases. Therefore, the differentiation is required to select the component impedances which can make the gain of the compensated digital signal decrease monotonically.

After the component impedances of the equalizer have been derived, a circuit simulation of the transmission line and the equalizer identifying the outcome of the compensation is performed(step 309). That is, the circuit simulation checks if the waveform of the compensated digital signal compensated by the equalizer is similar to the waveform of the original digital signal which hasn't been transmitted by the transmission line. Afterward, the equalizer circuit is manufactured with the derived component impedances, such as the derived resistance and the derived inductance (step 311).

Figure 4:
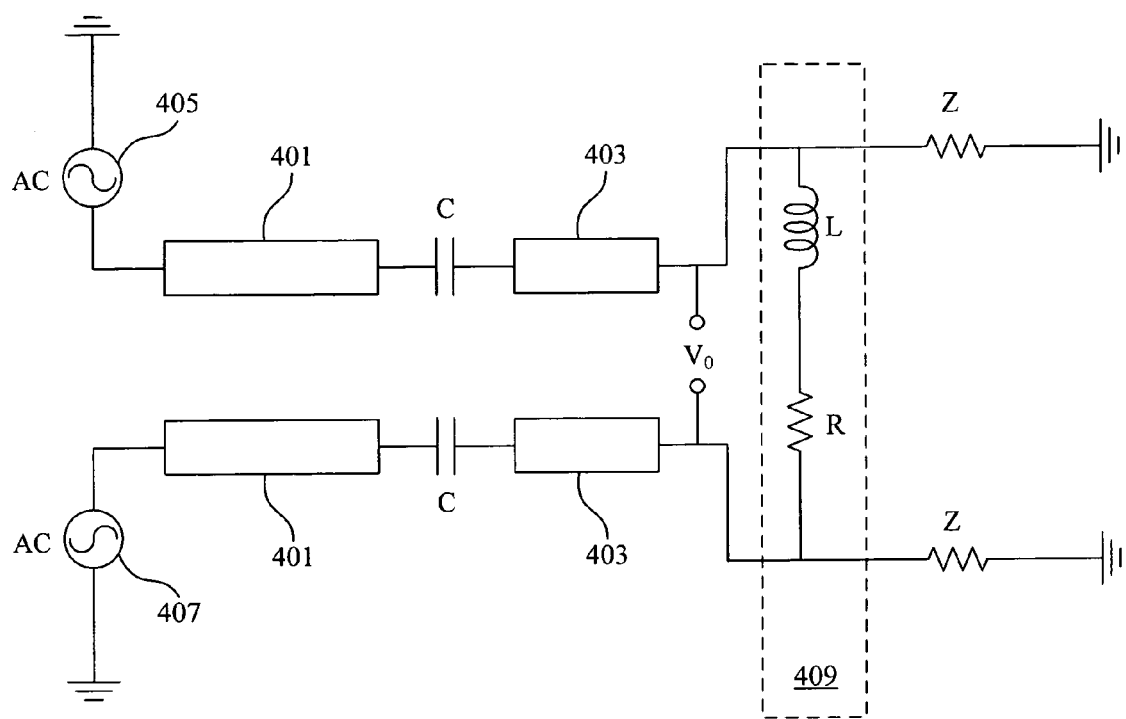
FIG. 4 shows the circuit of the transmission line and the equalizer according to one embodiment of the present invention.

FIG. 4 shows the circuit of the transmission line and the equalizer according to one embodiment of the present invention. The differential signal 405\407 is provided by the bus system. The bus system pre-emphasizes/de-emphasizes the differential signal first, then the differential signal is passed to the equalizer 409 through the transmission line 401, the capacitor C, and the transmission line 403. The equalizer 409 includes the serially connected inductor L and the resistor R. The load Z is electrically connected to the equalizer 409. The compensated digital signal is outputted from $V_o$. The load Z with 50 Ω resistance is selected in this embodiment.

In the condition of impedance matching between the transmission line and the equalizer, the equalizer scattering-parameter is $$H_{equalizer}(f) = \frac{2(R_e + j2\pi f L_e)}{Z_0 + 2(R_e + j2\pi f L_e)},$$

in which $R_e$ represents the resistances of the resistor R, $L_e$ represents the inductance of the inductor L, and $Z_o$ represents the impedance of the load Z. The transmission line scattering-parameter $H_{TX-Line}(f)$ can be measured by the network analyzer. Next, perform the integration and the differentiation about the equalizer scattering-parameter $H_{equalizer}(f)$, the transmission line scattering-parameter $H_{TX-Line}(f)$ the frequency-domain function $H_{emp}(f)$ of the digital signal, and the ideal gain $H_{ideal}(f)$ as mentioned above by the software to derive the component impedances of the resistor R and the inductor L.

Figure 5A:
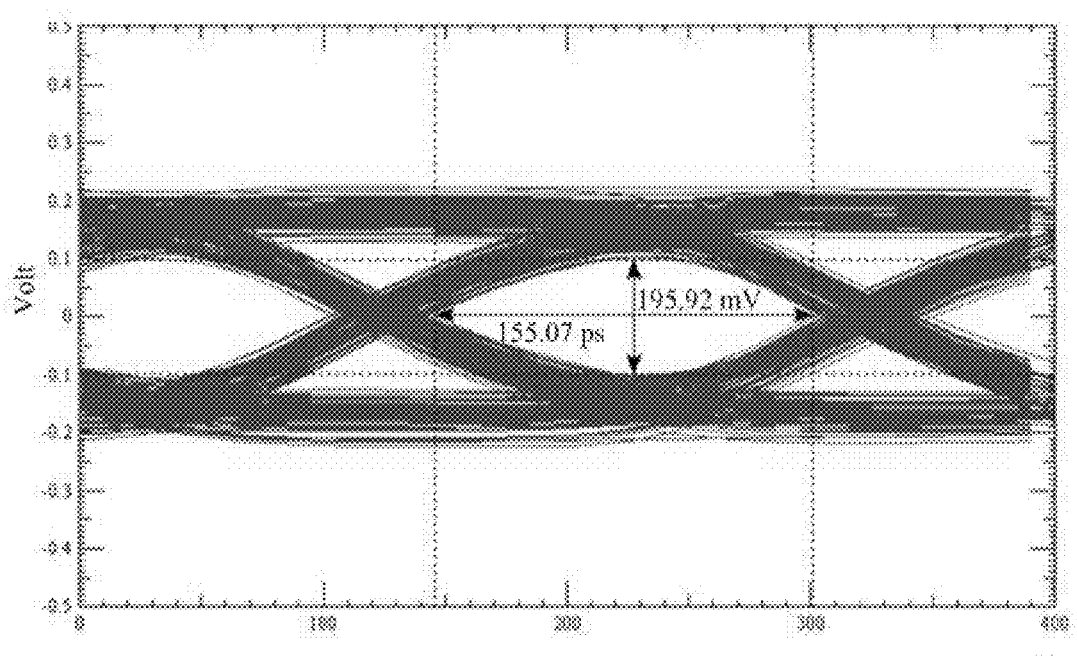
FIG. 5A shows the time-domain waveform of compensated 3.5 db de-emphasis signal according to one embodiment of the present invention.
Figure 5B:
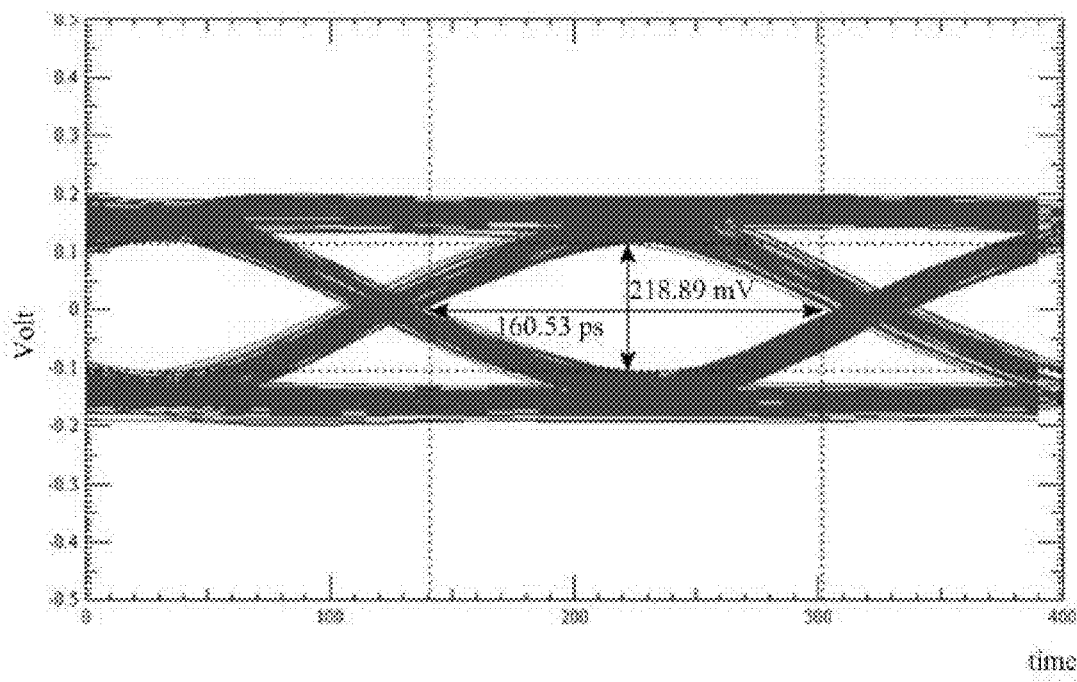
FIG. 5B shows the time-domain waveform of compensated 6 db de-emphasis signal according to one embodiment of the present invention.

FIG. 5A and FIG. 5B show the time-domain waveform of compensated digital signal which is de-emphasized 3.5 db and 6 db respectively according to the embodiments of the present invention. In FIG. 5A and FIG. 5B, 36-inch transmission lines transmit 400 mV 5 Gbps digital signals. In FIG. 5A, the digital signal is de-emphasized by 3.5 db first, and passed by the transmission line. After the integration and the differentiation processes stated above, the derived impedances of the resistor R and the inductor L are 119 Ω and 68 nH respectively. Compared with the uncompensated digital signal with 73.7 mV eye height and 93.19 ps eye width, the eye height and eye width of the compensated digital signal compensated by the equalizer are 195.92 mV and 155.07 ps respectively, which is a large improvement.

In FIG. 5B, the digital signal is de-emphasized by 6 db first, and passed by the transmission line. After the integration and the differentiation processes stated above, the derived impedances of the resistor R and the inductor L are 300 Ω and 172 nH respectively. Compared with the uncompensated digital signal with a 73.7 mV eye height and 93.19 ps eye width, the eye height and eye width of the compensated digital signal compensated by the equalizer are 218.89 mV and 160.53 ps respectively, which is a large improvement.

Figure 6A:
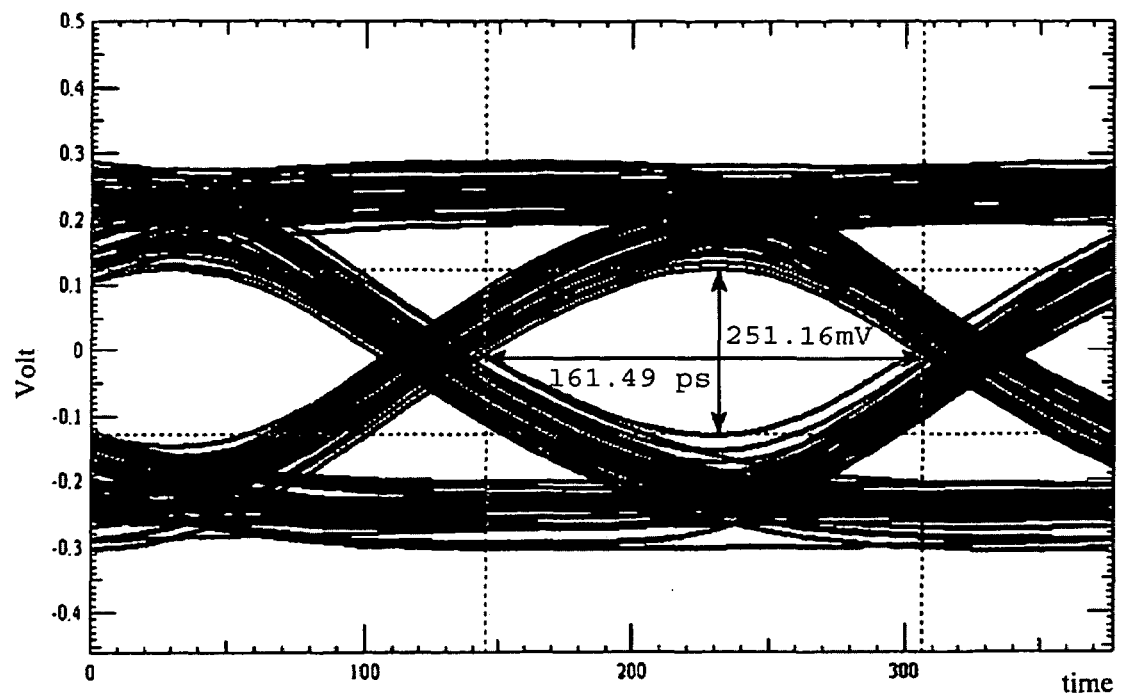
FIG. 6A shows the time-domain waveform of compensated 3.5 db pre-emphasis signal according to one embodiment of the present invention.
Figure 6B:
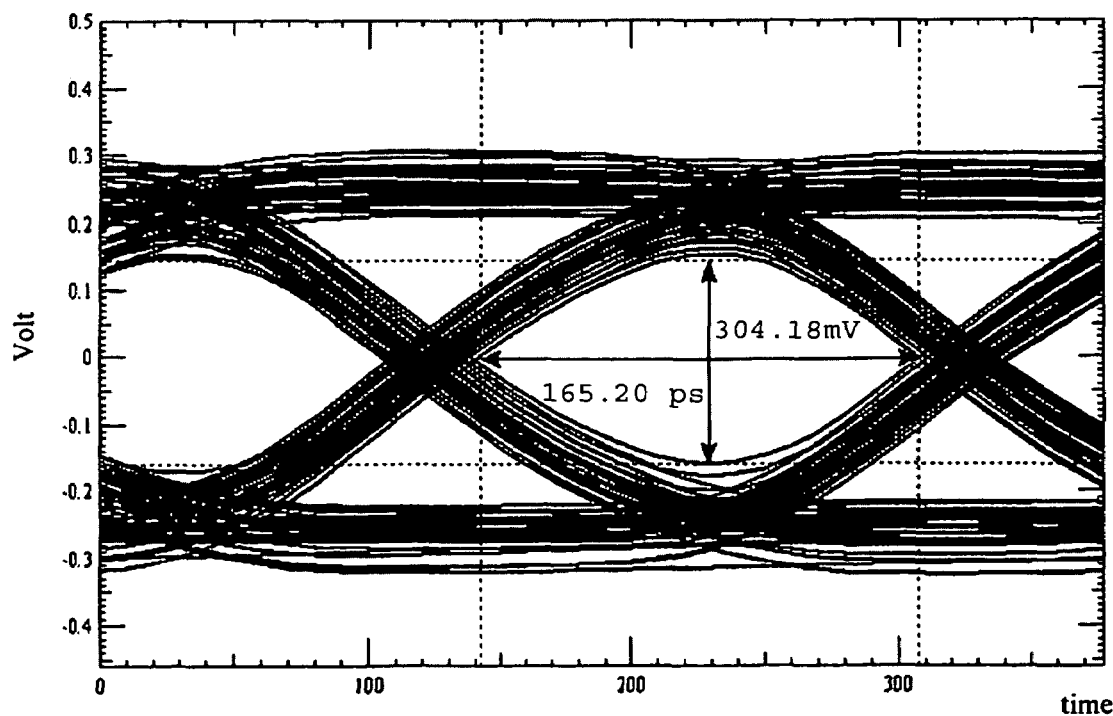
FIG. 6B shows the time-domain waveform of compensated 6 db pre-emphasis signal according to one embodiment of the present invention.

FIG. 6A and FIG. 6B show the time-domain waveform of the compensated digital signal which is pre-emphasized by 3.5 db and 6 db according to embodiments of the present invention. In FIG. 6A and FIG. 6B, a 36-inch transmission line transmits 400 mV 5 Gbps digital signals. In FIG. 6A, the digital signal is pre-emphasized by 3.5 db first, and passed by the transmission line. After the integration and the differentiation processes stated above, the derived impedances of the resistor R and the inductor L are 105 Ω and 57 nH respectively. Compared with the uncompensated digital signal, the eye height and eye width of the compensated digital signal compensated by the equalizer are 251.16 mV and 161.49 ps respectively, which is a large improvement.

In FIG. 6B, the digital signal is pre-emphasized by 6 db first, and passed by the transmission line. The derived impedances of the resistor R and the inductor L are 119 Ω and 68 nH respectively. Compared with the uncompensated digital signal, the eye height and eye width of the compensated digital signal compensated by the equalizer are 304.18 mv and 165.20 ps respectively, which is a large improvement.

According to the above embodiments, the method for manufacturing the transmission line equalizer can predict the required component impedances of the equalizer, which reduces the unnecessary circuit simulation; in addition, the method can compensate the signal losses caused by the transmission line more accurately.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing an equalizer used to compensate a digital signal passed by a transmission line, wherein the digital signal can be presented as a frequency-domain function, the method comprising:
    measuring a the transmission line scattering-parameter;
    performing an integration and a differentiation about the transmission line scattering-parameter, the frequency-domain function, an ideal gain, and an equalizer scattering-parameter to get the component impedances of the equalizer; and
    manufacturing the equalizer circuit with the derived component impedances,
    wherein the equalizer comprises an inductor and a resistor in series connection, and the equalizer scatterinq-parameter is $$H_{equalizer}(f) = \frac{2(R_e + j2\pi fL_e)}{Z_0 + 2(R_e + j2\pi fL_e)},$$

in which $R_e$ represents the resistance of the resistor, $L_e$ represents the inductance of the inductor, and the $Z_0$ represents the resistance of a load electrically connected to the equalizer.

2. The method as claimed in claim 1, wherein the ideal gain is the product of the frequency-domain function and the transmission line scattering-parameter at a pre-determined frequency.

3. The method as claimed in claim 2, wherein the pre-determined frequency is $$1/2\pi\tau \text{ HZ}, \pi$$

is a constant, and $\tau$ is a delay time.

4. The method as claimed in claim 1, further comprising processing a circuit simulation of the compensated digital signal to confirm if the frequency response of the compensated digital signal is as required.

5. The method as claimed in claim 1, further comprising fine tuning the component impedances derived by the integration and the differentiation in order to make the compensated digital signal close to the ideal gain.

6. The method as claimed in claim 1, wherein the integration is $$\int_0^\infty |(H_{TX-Line}(f) \times H_{emp}(f) \times H_{equalizer}(f)) - H_{ideal}(f)| df = \min,$$

$$H_{TX-Line}(f)$$

represents the transmission line scattering-parameter, $H_{emp}(f)$ represents the frequency-domain function of the digital signal, $H_{equalizer}(f)$ represents the equalizer scattering-parameter, $H_{ideal}(f)$ represents the ideal gain, and the min represents the minimum positive number.

7. The method as claimed in claim 1, wherein the differentiation is $$\frac{d\{20\log_{10}\lfloor H_{TX-Line}(f) \times H_{emp}(f) \times H_{equalizer}(f)\rfloor\}}{df} \leq 0, H_{TX-Line}(f)$$

represents the transmission line scattering-parameter, $H_{emp}(f)$ represents the frequency-domain function of the digital signal, $H_{equalizer}(f)$ represents the equalizer scattering-parameter.

8. The method as claimed in claim 1, wherein the frequency-domain function of the digital signal is $$F_{Emp}(\omega) = (1-\alpha)F(\omega) - \alpha F(\omega)e^{j\omega\tau}, F(\omega)$$

represents an original frequency-domain function of the digital signal, and $\alpha$ represents the de-emphasis parameter.

9. The method as claimed in claim 1, wherein the frequency-domain function of the digital signal is $$F_{Emp}(\omega) = (1+\alpha)F(\omega) - \alpha F(\omega)e^{j\omega\tau}, F(\omega)$$

represents an original frequency-domain function of the digital signal, and $\alpha$ represents the pre-emphasis parameter.

10. The method as claimed in claim 1, wherein the digital signal is provided by a Peripheral Component Interconnect (PCI) interface, a PCI express (PCIe) interface, a Serial ATA (SATA) interface, or a Parallel ATA (PATA) interface.

11. The method as claimed in claim 1, wherein the digital signal is a single ended signal.

12. The method as claimed in claim 1, wherein the digital signal is a differential signal including a positive input signal and a negative input signal.

* * * * *